United States Patent
Chen et al.

(10) Patent No.: US 11,232,356 B2
(45) Date of Patent: Jan. 25, 2022

(54) TRAINING GIANT NEURAL NETWORKS USING PIPELINE PARALLELISM

(71) Applicant: Google LLC, Mountain View, CA (US)

(72) Inventors: Zhifeng Chen, Sunnyvale, CA (US); Yanping Huang, Mountain View, CA (US); Youlong Cheng, Mountain View, CA (US); HyoukJoong Lee, Millbrae, CA (US); Dehao Chen, Fremont, CA (US); Jiquan Ngiam, Mountain View, CA (US)

(73) Assignee: Google LLC, Mountain View, CA (US)

( * ) Notice: Subject to any disclaimer, the term of this patent is extended or adjusted under 35 U.S.C. 154(b) by 17 days.

(21) Appl. No.: 16/989,787

(22) Filed: Aug. 10, 2020

(65) Prior Publication Data
US 2021/0042620 A1 Feb. 11, 2021

Related U.S. Application Data

(60) Provisional application No. 62/885,059, filed on Aug. 9, 2019.

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC ................................. G06N 3/08; G06N 3/04
See application file for complete search history.

(56) References Cited

U.S. PATENT DOCUMENTS

| 2017/0178085 A1* | 6/2017 | Kragh ............ G06Q 10/063114 |
| 2019/0227980 A1* | 7/2019 | McMahan ............ G06N 3/0454 |
| 2020/0082270 A1* | 3/2020 | Gu ........................ G06F 21/602 |
| 2020/0193313 A1* | 6/2020 | Ghanta .................. G06N 5/046 |

(Continued)

OTHER PUBLICATIONS

McMaham et al.—"Communication-Efficient Learning of Deep Networks from Decentralized Data"—2017—https://arxiv.org/pdf/1602.05629.pdf (Year: 2017).*

(Continued)

*Primary Examiner* — Viker A Lamardo
(74) *Attorney, Agent, or Firm* — Fish & Richardson P.C.

(57) ABSTRACT

Methods, systems, and apparatus, including computer programs encoded on computer storage media, for training giant neural networks. One of the methods includes obtaining data specifying a partitioning of the neural network into N composite layers that form a sequence of composite layers, wherein each composite layer comprises a distinct plurality of layers from the multiple network layers of the neural network; obtaining data assigning each of the N composite layers to one or more computing devices from a set of N computing devices; partitioning a mini-batch of training examples into a plurality of micro-batches; and training the neural network, comprising: performing a forward pass through the neural network until output activations have been computed for each micro-batch for a final composite layer in the sequence, and performing a backward pass through the neural network until output gradients have been computed for each micro-batch for the first composite layer in the sequence.

20 Claims, 5 Drawing Sheets

(56) References Cited

U.S. PATENT DOCUMENTS

2020/0202243 A1* 6/2020 Guttmann ............. G06N 5/043
2020/0218937 A1* 7/2020 Visentini Scarzanella ..................
                                                    G06N 3/0454

OTHER PUBLICATIONS

Huang et al.—"YerbaBuena: Securing Deep Learning Inference Data via Enclave-based Ternary Model Partitioning"—May 16, 2019—https://arxiv.org/pdf/1807.00969v2.pdf (Year: 2019).*
Harlap et al.—"PipeDream: Fast and Efficient Pipeline Parallel DNN Training"—2018—https://arxiv.org/pdf/1806.03377.pdf (Year: 2018).*
Abadi et al, "Tensor-flow: a system for large-scale machine learning" Usenix, 2016, 21 pages.
Berg et al, "Birdsnap: Large-scale fine-grained visual categorization of birds" CVPR, 2014, 8 pages.
Bossard et al, "Food-101—mining discriminative components with random forests" ECCV, 2014, 16 pages.
Bottou, "Large-scale machine learning with stochastic gradient descent" Springer, 2010, 10 pages.
Brock et al, "Large scale GAN training for high fidelity natural image synthesis" arXiv, 2018, 29 pages.
Chen et al, "Dual path networks" NIPS, 2017, 9 pages.
Chen et al, "Efficient and robust parallel dnn training through model parallelism on multi-gpu platform" arXiv, 2018, 13 pages.
Chen et al, "Mxnet: A flexible and efficient machine learning library for heterogeneous distributed systems" arXiv, 2015, 6 pages.
Chen et al, "Pipelined backpropagation for context-dependent deep neural networks" Thirteenth Annual Conference on the International Speech Communication Association, 2012, 4 pages.
Chen et al, "The best of both worlds: Combining recent advances in neural machine translation" Association for Computational Linguistics, 2018, 11 pages.
Chen et al, "Training deep nets with sublinear memory cost" arXiv, 2016, 12 pages.
Chiu et al, "State-of-the-art speech recognition with sequence-to-sequence models" arXiv, 2018, 5 pages.
Coleman et al, "Analysis of dawnbench, a time-to-accuracy machine learning performance benchmark" arXiv, 2018, 11 pages.
Cubuk et al, "Autoaugment: Learning augmentation policies from data" arXiv, 2018, 14 pages.
Cui et al, "Large scale fine-grained categorization and domain-specific transfer learning" IEEE Conference on Computer Vision and Pattern Recognition, 2018, 10 pages.
Dean et al, "Large scale distributed deep networks" NIPS, 2012, 9 pages.
Deng et al, "Imagenet: A large-scale hierarchical image database" CVPR, 2009, 8 pages.
Devlin et al., "Bert: Pre-training of deep bidirectional transformers for language understanding" arXiv, 2018, 14 pages.
DeVries et al, "Improved regularization of convolutional neural networks with cutout" arXiv, 2017, 8 pages.
Gehring et al, "Convolutional sequence to sequence learning" arXiv, 2017, 15 pages.
Girshick, "Fast r-cnn" International Conference on Computer Vision, 2015, 9 pages.
Goyal et al, "Accurate, large minibatch sgd: training imagenet in 1 hour" arXiv, 2017, 12 pages.
Griewank et al, "Algorithm 799: revolve: an implementation of checkpointing for the reverse or adjoint mode of computational differentiation" ACM Transactions on Mathematical Software, 2000, 27 pages.
Harlap et al, "Pipedream: Fast and efficient pipeline parallel dnn training" arXiv, 2018, 14 pages.
He et al, "Identity mappings in deep residual networks" arXiv, 2016, 15 pages.
Hu et al, "Squeeze-and-excitation networks" arXiv 2018, 14 pages.
Ioffe et al, "Batch normalization: Accelerating deep network training by reducing internatl covariate shift" ICML, 2015, 9 pages.
Jia et al, "Caffe: Convolutional architecture for fast feature embedding" Proceedings of the 22nd ACM international conference on Multimedia, 2014, 4 pages.
Jia et al, "Highly scalable deep learning training system with mixed-precision: Training imagenet in four minutes" arXiv, 2018, 9 pages.
Kornblith et al, "Do better imagenet models transfer better?" CVPR, 2018, 11 pages.
Krause et al, "Collecting a large-scale dataset of fine-grained cars" Second Workshop on Fine-Grained Visual Categorization, 2013, 2 pages.
Krizhevsky, "Learning multiple layers of features from tiny images" Computer Science Department, 2009, 60 pages.
Krizhevsky, "One weird trick for parallelizing convolutional neural networks" arXiv, 2014, 7 pages.
Kumar et al, "Introduction to parallel computing: design and analysis of algorithms" Benjamin/Cummings Redwood City, 1994, 4 pages.
Lee et al, "On model parallelization and scheduling strategies for distributed machine learning" NIPS, 2014, 9 pages.
Li et al, "Scaling distributed machine learning with the parameter server" USENIX, 2014, 17 pages.
Mahajan et al, "Exploring the limits of weakly supervised pretraining" ECCV, 2018, 23 pages.
Maji et al, "Fine-grained visual classification of aircraft" arXiv, 2013, 6 pages.
McCann et al, "Learned in translation Contextualized word vectors" arXiv, 2017, 11 pages.
Micikevicius et al, "Mixed precision training" arXiv, 2018, 12 pages.
Mirhoseini et al, "Device placement optimization with reinforcement learning" arXiv, 2017, 11 pages.
Ngiam et al, "Domain adaptive transfer learning with Specialist Models" arXiv, 2018, 10 pages.
Ott et al, "Scaling neural machine translation" arXiv, 2018, 9 pages.
Parkhi et al, "Cats and dogs" IEEE Conference on Computer Vision and Pattern Recognition, 2012, 8 pages.
Paszke et al, "Automatic differentiation in pytorch" NIPS, 2017, 4 pages.
Patrowski et al, "Performance analysis of a pipelined backpropagation parallel algorithm" IEEE Transactions on Neural Networks, 1993, 12 pages.
Peng et al, "Megdet: A large mini-batch object detector" CVPR, 2017, 9 pages.
Peng et al, "Object-part attention model for fine-grained image classification" IEEE Transactions on Image Processing, 2018, 14 pages.
Peters et al, "Deep contextualized word representations" ACL, 2018, 11 pages.
Petrowski et al, "Performance analysis of a pipelined backpropagation parallel algorithm" IEEE Transactions on Neural Networks, 1993, 12 pages.
Radford et al, "Language models are unsupervised multitask learners" Papers with Codes, 2019, 24 pages.
Razavian et al, "Cnn features off-the-shelf: An astounding baseline for recognition" arXiv, 2014, 8 pages.
Real et al, "Regularized evolution for image classifier architecture search" arXiv, 2018, 16 pages.
Shazeer et al, "Mesh-Tensorflow: Deep learning for supercomputers" NIPS, 2018, 10 pages.
Shelhamer et al, "Fully convolutional networks for semantic segmentation" IEEE Trans. Pattern Anal. Mach. Intell., 2017, 12 pages.
Shen et al, "Lingvo: a modular and scalable framework for sequence-to-sequence modeling" arXiv, 2019, 17 pages.
Smith et al, "Don't decay the learning rate, increase the batch size" arXiv, 2017, 11 pages.
Sun et al, "Revisiting unreasonable effectiveness of data in deep learning era" ICCV, 2017, 13 pages.
Szegedy et al, "Going deeper with convolutions" Proceedings of the IEEE conference on computer vision and pattern recognition, 2015, 9 pages.

(56) References Cited

OTHER PUBLICATIONS

Szegedy et al, Inception-v4, inception resnet and the impact of residual connections on learning, 2017, 7 pages.
Szegedy et al, "Rethinking the inception architecture for computer vision" CVPR, 2016, 9 pages.
Valiant, "A bridging model for parallel computation" Communications of the ACM, 1990, 9 pages.
Vaswani et al, "Attention is all you need" arXiv, 2017, 15 pages.
Wei et al, "Mask-cnn: Localizing parts and selecting descriptors for fine-grained bird species categorization" Pattern Recognition, 2017, 25 pages.
Wu et al, "Google's neural machine translation system: Bridging the gap between human and machine translation" Transactions of the Association for Computational Linguistics, 2016, 23 pages.
Xie et al, "Aggregated residual transformations for deep neural networks" arXiv, 2017, 10 pages.
Yu et al, "Deep layer aggregation" IEEE Conference on Computer Vision and Pattern Recognition, 2018, 10 pages.
Zhang et al, "Polynet: A pursuit of structural diversity in very deep networks" CVPR, 2017, 9 pages.
Zoph et al, "Learning transferable architectures for scalable image recognition" CVPR, 2018, 14 pages.

\* cited by examiner

TRAINING GIANT NEURAL NETWORKS USING PIPELINE PARALLELISM

CROSS-REFERENCE TO RELATED APPLICATION

This application is a non-provisional of and claims priority to U.S. Provisional Patent Application No. 62/885,059, filed on Aug. 9, 2019, the entire contents which are hereby incorporated by reference.

BACKGROUND

This specification relates to distributed training of neural networks across multiple hardware devices.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of network parameters.

In general, neural networks with deeper layers and larger layer size usually outperform their shallower and smaller counterparts after being trained, e.g., when applied for image detection or natural language processing related tasks. Larger and deeper neural networks inherently have a larger number of parameters, and some may be categorized as giant neural networks. A giant neural network is a neural network with many network parameters, e.g., 1 million parameters, 10 million parameters, 500 million parameters, or 2 billion or more parameters.

The network parameters for a neural network are values that impact the operations performed by the neural network and that are adjusted as part of training. For example, the network parameters can include values of weight matrices and, in some cases, bias vectors of the network layers of the neural network.

The hyperparameters of a neural network are values that are not modified by the training process. The hyperparameters can include values that impact how the values of the network parameters are updated by the training process e.g., the learning rate or other update rule that defines how the gradients computed during backpropagation are used to update the network parameter values, objective function values, e.g., entropy cost, weights assigned to various terms of the objective function, and so on.

SUMMARY

This specification generally describes techniques for training giant neural networks.

According to an aspect, a system for training a neural network having multiple network layers includes: one or more computers and one or more storage devices storing instructions that are operable, when executed by the one or more computers, to cause the one or more computers to perform operations. The operations include: obtaining data specifying a partitioning of the neural network into N composite layers that form a sequence of composite layers, obtaining data assigning each of the N composite layers to one or more computing devices from a set of N computing devices; partitioning a mini-batch of training examples for training the neural network into a plurality of micro-batches; and training the neural network on the mini-batch of training examples. Each composite layer comprises a distinct plurality of layers from the multiple network layers of the neural network.

Training the neural network on the mini-batch of training examples include: performing a forward pass through the neural network over a plurality of forward time steps until output activations have been computed for each micro-batch for a final composite layer in the sequence, and performing a backward pass through the neural network over a plurality of backward time steps until output gradients have been computed for each micro-batch for a first composite layer in the sequence.

Performing the forward pass through the neural network for each of the forward time-steps and for each computing device includes: determining whether, for any of the plurality of micro-batches, input activations to the composite layer assigned to the computing device are available as of the forward time-step, and in response to determining that the input activations to the composite layer assigned to the computing device are available as of the forward time-step, performing, at the computing device, a forward pass through the composite layer assigned to the computing device using the available input activations for one of the micro-batches to generate an output activation for the composite layer for the micro-batch.

Performing the backward pass through the neural network for each backward time-step and for each computing device includes: determining whether, for any of the plurality of micro-batches, gradient inputs for computing gradients of an objective function with respect to parameters of the composite layer assigned to the computing device are available as of the backward time-step, and in response to determining that gradient inputs to the composite layer assigned to the computing device are available as of the backward time-step, performing, at the computing device, a backward pass through the composite layer assigned to the computing device using the available input gradients for one of the micro-batches to generate an output gradient for the composite layer for the micro-batch.

The subject matter described in this specification can be implemented in particular embodiments so as to realize one or more of the following advantages.

The described system allows for effectively distributing the training of giant neural networks, i.e., neural networks with a very large number of parameters, across multiple computing devices. By partitioning the neural network into a plurality of composite layers, the described system can scale arbitrary giant neural network architectures beyond the memory limitations of a single computing device.

The described system adopts rematerialization techniques to recompute operations in each composite layer during backpropagation to further reduce the peak memory cost of the training. The system can obviate the need for shuffling data between a computing device and an external memory source, because memory requirements during backpropagation are reduced and therefore more likely to be able to be satisfied using only memory local to the device.

The described system guarantees consistent gradient updates in the partitioned neural network regardless of the number of partitions of the neural network, allowing linearly scaling up with computing devices available to the system for training large models. This is due to synchronous mini-batch gradient descent method adopted by the system, i.e., gradients are accumulated across all micro-batches of a mini-batch and updated after the entire mini-batch has been processed, where the micro-batches are generated from each mini-batch using batch splitting technique of pipeline parallelism implemented by the system, and pipelined across all computing devices sequentially. Thus, the described system does not have inconsistency or staleness issues associated with alternate pipelining approaches using multiple replicas and synchronized training. Scaling up existing training models as described in this specification can be performed without changes in the hyperparameters, improving the trained model's accuracy and further facilitating flexible implementation of the disclosed subject matter to existing networks.

Additionally, the pipeline parallelism in the system also minimizes the bubble overhead time as each computing device can operate on each micro-batch sequentially in the respective composite layer and the run time for both forward and backward propagations on a micro-batch is much smaller than that of a mini batch.

Moreover, the pipeline parallelism introduces little additional communication overhead when scaling a neural network. Inter-device communication only takes place at partition boundaries for every micro-batch and the introduced communication overhead is marginal, thus the system can be extended to hardware environments where high-speed device interconnects are not available.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
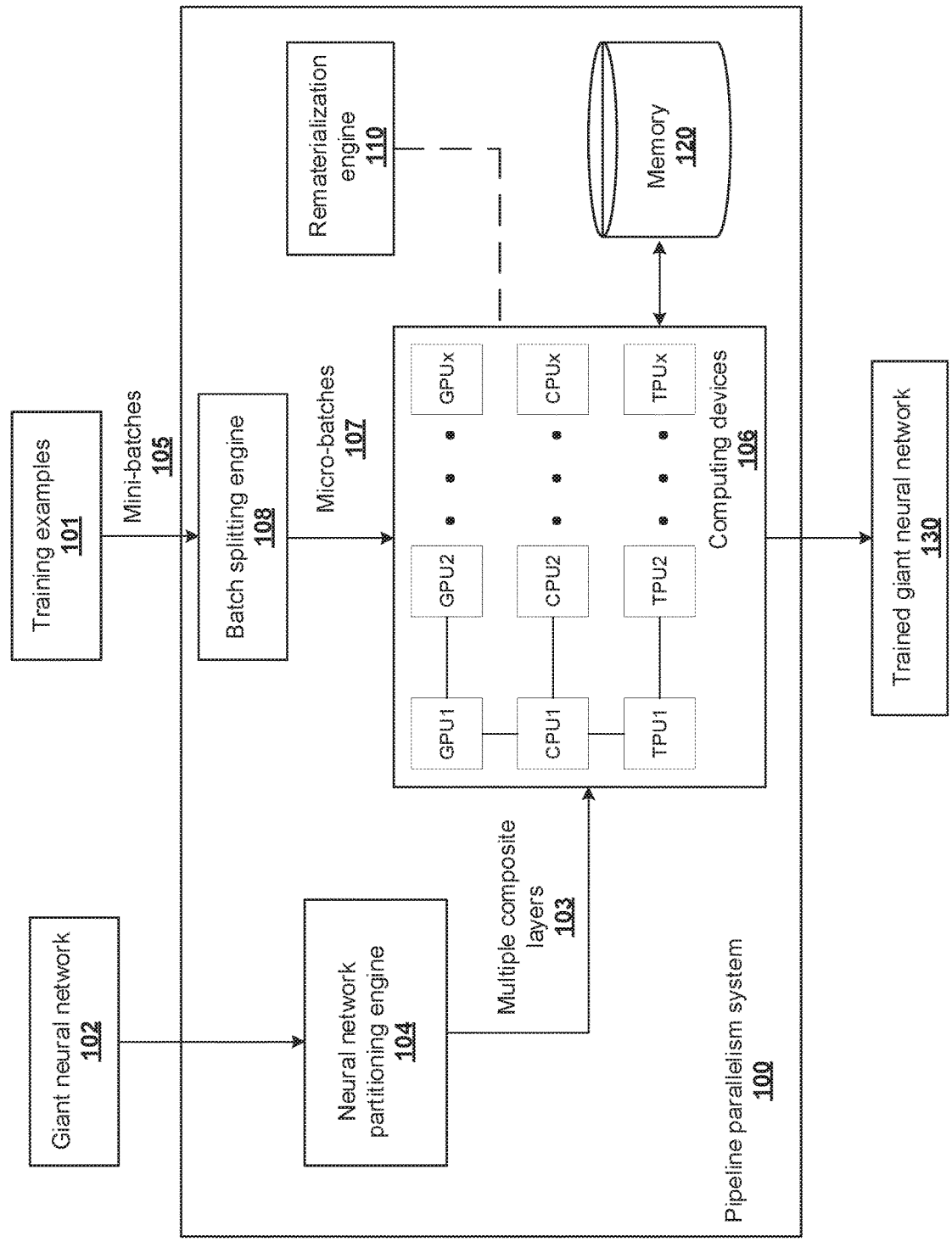
FIG. 1 shows an example pipeline parallelism system for training neural networks.

For better performance, neural networks tend to have deeper layers and larger layer size, particularly for neural networks used for image processing tasks, e.g., object detection/recognition, or natural language processing. While larger neural networks have brought remarkable quality improvements to several fields, scaling neural networks introduces significant practical challenges. For example, the bottleneck for training a giant neural network can be the memory limit for each individual computing device, i.e., devices having central processing units ("CPUs"), graphics processing units ("GPUs"), tensor processing units ("TPUs"). In some situations, even if a giant neural network has been partitioned and each part of the neural network is assigned to a respective computing device, the training example sets can exceed the memory limit for the respective computing device. For another example, the bottleneck can be limited communication bandwidths between computing devices, e.g., data transferring rate between GPUs or TPUs and CPUs can be insufficiently fast comparing to computing rate of each individual computing device, thus the wait time for data transferring between devices can be comparable to, sometimes even much longer than, the run time on each computing device, leading to a slow training performance. For another example, the bottleneck can be bubble overhead on computing devices. Bubble overhead refers to the time that a succeeding computing device that is assigned a second part of the operations in a sequence spends waiting for the output from a preceding computing device that is assigned a first part of the operations in the sequence. That is, the input for the succeeding computing device to perform the second part of the operations is the output from the preceding computing device performing the first part of the operations. Given that, the succeeding computing device has to stay idle and wait until the preceding computing device completes the required computations. The time that the succeeding computing device stays idle is referred to as bubble overhead. Thus, the usage of each computing device can be low at time steps when the bubble overhead time is too long, particularly if there is only one device operating at a time step. Currently, efficient parallelism methods are task-specific, thus there is an increasing demand for a robust and flexible infrastructure capable of training arbitrary large (or giant) neural networks.

This specification describes a system implemented as computer programs on one or more computers in one or more locations that trains a neural network having a plurality of network parameters to perform a neural network task. In particular, the system can train a giant neural network, i.e., a neural network having 1 million or more network parameters, to determine trained values of the network parameters using pipeline parallelism of the neural network across a plurality of computing devices, e.g., devices having CPUs, GPUs and TPUs and/or other types of processing units that can perform as computing devices. The system can integrate recomputation (or rematerialization) of activation functions during backward propagations with pipeline parallelism for more efficient memory usage and hardware utilization of each individual computing device.

FIG. 1 shows an example pipeline parallelism system 100 for training neural networks. The pipeline parallelism system 100 is an example of a system implemented as computer programs on one or more computers in one or more locations, in which the systems, components, and techniques described below can be implemented.

The pipeline parallelism system 100 receives as input data specifying a giant neural network 102 and training examples 101. Generally, the training examples 101 include a plurality of mini-batches 105. In particular, a larger set of training data has been divided into a plurality of mini-batches that each includes a fixed number of training examples 101.

Generally, the system 100 trains the giant neural network 102, i.e., to determine trained values of the parameters of the giant neural network 102 and outputs data specifying a trained giant neural network 103, i.e., data that includes at least the trained values of the parameters.

The system 100 can receive the training examples 101 and the data specifying the giant neural network 102 in any of a variety of ways. For example, the system 100 can receive training data as an upload from a remote user of the system over a data communication network, e.g., using an application programming interface (API) made available by the system 100. As another example, the system 100 can receive an input from a user specifying which data that is already maintained by the system 100 should be used for training the giant neural network 102.

The giant neural network 102 can be trained to perform any kind of machine learning task, i.e., can be configured to receive any kind of digital data input and to generate any kind of score, classification, or regression output based on the input.

In some cases, the giant neural network 102 is a neural network that is configured to perform an image processing task, i.e., receive an input image and to process the input image to generate a network output for the input image. For example, the task may be image classification and the output generated by the giant neural network 102 for a given image may be scores for each of a set of object categories, with each score representing an estimated likelihood that the image contains an image of an object belonging to the category. As another example, the task can be image embedding generation and the output generated by the giant neural network 102 can be a numeric embedding of the input image. As yet another example, the task can be object detection and the output generated by the giant neural network 102 can identify locations in the input image at which particular types of objects are depicted. As yet another example, the task can be image segmentation and the output generated by the giant neural network 102 can assign each pixel of the input image to a category from a set of categories.

As another example, if the inputs to the giant neural network 102 are Internet resources (e.g., web pages), documents, or portions of documents or features extracted from Internet resources, documents, or portions of documents, the task can be to classify the resource or document, i.e., the output generated by the giant neural network 102 for a given Internet resource, document, or portion of a document may be a score for each of a set of topics, with each score representing an estimated likelihood that the Internet resource, document, or document portion is about the topic.

As another example, if the inputs to the giant neural network 102 are features of an impression context for a particular advertisement, the output generated by the giant neural network 102 may be a score that represents an estimated likelihood that the particular advertisement will be clicked on.

As another example, if the inputs to the giant neural network 102 are features of a personalized recommendation for a user, e.g., features characterizing the context for the recommendation, e.g., features characterizing previous actions taken by the user, the output generated by the giant neural network 102 may be a score for each of a set of content items, with each score representing an estimated likelihood that the user will respond favorably to being recommended the content item.

As another example, if the input to the giant neural network 102 is a sequence of text in one language, the output generated by the giant neural network 102 may be a score for each of a set of pieces of text in another language, with each score representing an estimated likelihood that the piece of text in the other language is a proper translation of the input text into the other language.

As another example, the task may be an audio processing task. For example, if the input to the giant neural network 102 is a sequence representing a spoken utterance, the output generated by the giant neural network 102 may be a score for each of a set of pieces of text, each score representing an estimated likelihood that the piece of text is the correct transcript for the utterance. As another example, the task may be a keyword spotting task where, if the input to the giant neural network 102 is a sequence representing a spoken utterance, the output generated by the giant neural network 102 can indicate whether a particular word or phrase ("hotword") was spoken in the utterance. As another example, if the input to the giant neural network 102 is a sequence representing a spoken utterance, the output generated by the giant neural network 102 can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

The giant neural network 102 is a neural network having a set of parameters ("network parameters") that is configured to process network inputs in accordance with the trainee parameters to generate an output for the particular task. The giant neural network can have any appropriate architecture that allows the neural network 102 to receive network inputs of the type required by the particular task and to generate network outputs of the form required for the particular task. Examples of giant neural networks 102 that can be trained by the system 100 include fully-connected neural networks, convolutional neural networks, recurrent neural networks, attention-based neural networks, e.g., Transformers, and so on.

A giant neural network 102 can be defined as a sequence of L network layers. Each network layer i ($1 \leq i \leq L$) can also have a forward computation function $f_i$, a backpropagation function $b_i$, and optionally a cost estimation function $c_i$. A forward computation function $f_i$ can include an activation function $a_i$, e.g., sigmoid, tanh, or ReLU, operations to generate an input for the activation function, i.e., generating an intermediate variable as an input for the activation function using operations such as matrix multiplication on the network parameters of the network layer, the addition of a bias, or a convolution, and/or other optimizations such as generating soft-matrix and batch normalization. A backpropagation function $b_i$ is any function that computes a gradient of the error between an output activation at a network layer i and the expected output of the network at the network layer i. The backpropagation function $b_i$ can use the output gradient computed by a previous layer i+1 to compute the error and obtain the output gradient for the network layer i. Each network layer has a plurality of network parameters that are adjusted as part of neural network training, i.e., weight matrices and bias vectors. The network parameters are utilized within each network layer during training when performing operations such as tensor productions, convolution or attention mechanism.

Before training, the neural network partitioning engine 104 of the pipeline parallelism system 100 takes in as input the giant neural network 102 and then outputs a plurality of composite layers 103. In some implementations, the engine 104 can partition the neural network into K composite layers 103. Each composite layer $P_k$ of 103 ($1 \leq k \leq K$) includes a plurality of consecutive network layers between layers i and j of the L neural network layers, where $1 \leq i < j \leq L$ and the composite layers are disjoint from each other, i.e., each layer is assigned to only one composite layer. In this specification, the plurality of network layers in a composite layer includes two portions. The first portion is referred to as the boundary network layers of the composite layer, i.e., the first layer and the last layer of the composite layer. The second portion is referred to as the internal network layers of the composite layer, i.e., all layers except for the boundary network layers of the composite layer.

The network parameters for a composite layer $P_k$ are represented by the union of the network parameters for each network layer in the composite layer. The composite forward computation function for a composite layer $P_k$ having (j−i+1) network layers is the composition of operations performed for each network layer of a neural network, represented as $F_k = f_j \circ f_{j-1} \ldots \circ f_{i+1} \circ f_i$. For example, $f_i$ for a network layer i can represent an activation function for the network layer i. In some implementations, $f_i$ for a network layer i can represent an activation function and respective operations incorporated with the activation function of the network layer. The composite forward computation function of a composite layer $P_k$ takes as input the output of a composite forward computation function of a preceding composite layer $P_{k-1}$ in the forward sequence defined by the neural network.

Similarly, the composite backpropagation function for a composite layer $P_k$ having (j−i+1) network layers is the composition of each backpropagation function for each network layer, represented as: $B_k = b_i \circ b_{i+1} \ldots \circ b_{j-1} \circ b_j$. The composite backpropagation function of a composite layer $P_k$ takes as input the output of a composite backpropagation function of a succeeding composite layer $P_{k+1}$ in the backward sequence defined by the neural network. The cost estimation function for a composite layer $P_k$ having (j−i+1) network layers is the composition of the cost estimation function for each network layer, represented as: $C_k = \Sigma_{l=i}^{j} c_l$. For a given network layer i, $c_i$ represents the static computation cost given the shapes of all inputs to the network layer i. Therefore, $C_k$ represents the static computation cost for the composite layer $P_k$.

The K composite layers 103 form the sequence defined by the giant neural network 102, starting from a first composite layer $P_1$ that includes the input layer i=1 for the neural network, and ending with a last composite layer $P_K$ that includes the output layer i=L for the neural network. In this specification, the succeeding and preceding composite layers relative to a particular composite layer in the sequence are sometimes called neighboring composite layers for the particular composite layer.

Next, the system 100 assigns each of the plurality of composite layers 103 to a respective device of the computing devices 106 for computing the forward computation functions and backpropagation gradients within each composite layer. In some implementations, the system 100 can partition the neural network based on the number of devices available, i.e., so that each device is assigned one composite layer. For example, the computing devices 106 have K computing devices available for processing the composite layers and the system 100 can therefore divide the giant neural network 102 into K composite layers 103.

Each device 106 can have access to a memory (120) in the system 100, e.g., a random access memory ("RAM"), for storing instructions and data, e.g., a matrix or matrices representing network parameters for all network layers of a composite layer and instructions for executing forward computation functions and backpropagation functions. In some implementations, each device 106 can instead have its own memory independent to each other. Generally, each device is a hardware resource that performs operations independent of other devices. For example, each device is a processing unit or can have one or more processing units. The devices can include accelerators such as GPUs and CPUs, as well as specialized hardware resources for efficiently performing certain operations, e.g., matrix multiplication, used in training a neural network. Examples of specialized hardware resources include Tensor Processing Units ("TPU"), Field Programmable Gate Arrays ("FGPA"), and Application Specific Integrated Circuits ("ASIC").

Each device 106 can be heterogeneous, e.g., have multiple processing units each of a different type. The computing devices 106 can be heterogeneous and include devices with different types of processing units that can vary from device-to-device. Alternatively, each device in the plurality of computing devices 106 can include the same number and types of processing units.

Each device 106 can also have a respective computational capability. That is, each device can have different amount of memory 120, processing speed, or other architectural characteristics. Thus, some devices can perform operations that other devices cannot. For example, some operations can require a certain amount of memory that only particular devices have, or some devices are configured to only perform a particular type of operation, e.g., inference. In some implementations, the system 100 can partition the neural network 102 so that more computationally expensive composite layers are assigned to devices having a relatively higher computational capacity as compared to other devices.

Referring back to the neural network partitioning engine 104, the engine 104 can balance the partitioning of the neural network and the assigning of the plurality of composite layers 103 to computing devices 106 so that devices processing a respective assigned composite layer in parallel with each other can finish processing a respective set of training examples in approximately the same time.

The total number of partitions can be preset to the system 100 and the partitioning process utilized within the partition engine 104 can minimize the variance of the estimated static computing cost for each composite layer in order to obtain a minimum total computation cost across all composite layers 103. The total computation cost is defined by summing each estimated static computing cost $C_k$ for each composite layer $P_k$, i.e., $C_K = \Sigma_{k=1}^{K} C_k$. By minimizing the variance, the overall efficiency of the system 100 is maximized.

For example, the system 100 can compute a static computational cost $C_k$ for each composite layer $P_k$ to determine if the static computational cost of each composite layer falls within a predetermined threshold; if this is not the case, then the system 100 can repartition the neural network to obtain different composite layers until the computational costs of the composite layers are similar within the predetermined threshold. In some implementations, the system 100 can compute a variance of the static computational costs of all of the composite layers and repartition the neural network if the variance exceeds a predetermined value.

The partitioning engine 104 of the system 100 can have a predetermined threshold or predetermined value for static computational costs for the composite layers 103 obtained empirically, or by user input. Alternatively or in addition, the predetermined threshold and the predetermined value can take into account the relative computational capacity for the computing devices 106 assigned to the plurality of composite layers 103.

The batch splitting engine 108 of the system 100 takes as input the training examples 101 including a plurality of mini-batches 105, and splits each mini-batch into a plurality of micro-batches 107 of equal size, as shown in FIG. 1.

The size of each micro-batch 107 split from a mini-batch 105 by the batch splitting engine 108 can vary from implementation to implementation, but micro-batches 107 are split uniformly and are strictly less than the size of a corresponding mini-batch 105. For example, if the splitting engine 108 receives a mini-batch of size N and divides it into T micro-batches, thus each micro-batch has a dimension of $$\frac{N}{T}.$$

For example, a mini-batch can have a size of 128 training examples and be split into 16 micro-batches, with each micro-batch having a size of 8 training examples. As another example, a mini-batch can have a size of 256,000 training examples and be split into 1600 micro-batches, with each micro-batch having a size of 160 training examples.

In some implementations, the size of micro-batches 108 can also be customized for a computing device with a specific memory limit. The number of micro-batches generated from a mini-batch can also be preset for the system 100.

Alternatively, a first device 106 assigned to a first composite layer $P_1$ can be configured to split an input mini-batch 105 into a plurality of micro-batches 107 of equal size, instead of employing a batch splitting engine 108.

The operations, i.e., training operations such as a forward computation function $f_i$, and a backpropagation function $b_i$ of each internal network layer in a respective composite layer are conducted by a respective computing device 106 based on one or more micro-batches 107.

More specifically, the computing devices 106 repeatedly preform training operations for their respective assigned composite network layers 103 to jointly train the giant neural network 102, i.e., to repeatedly adjust the network parameters of the neural network 102 based on the output of backpropagation functions at each layer across respective composite layers partitioned from the neural network 102.

The training process will be described in more detail below.

To further optimize usage of memory 120 of each computing device of the computing devices 106, the system 100 includes a rematerialization engine 110 to determine, at each time step of training, whether the outputs generated by an internal layer of any given composite layer should be saved for later use or recomputed when necessary later, i.e., when needed for the backpropagation function for the internal layer. Each computing device can have an independent rematerialization schedule planned by the rematerialization engine 110. Alternatively, each computing device can share the same recomputation process. Rematerialization within each computing device of computing devices 106 will be described below.

Figure 2:
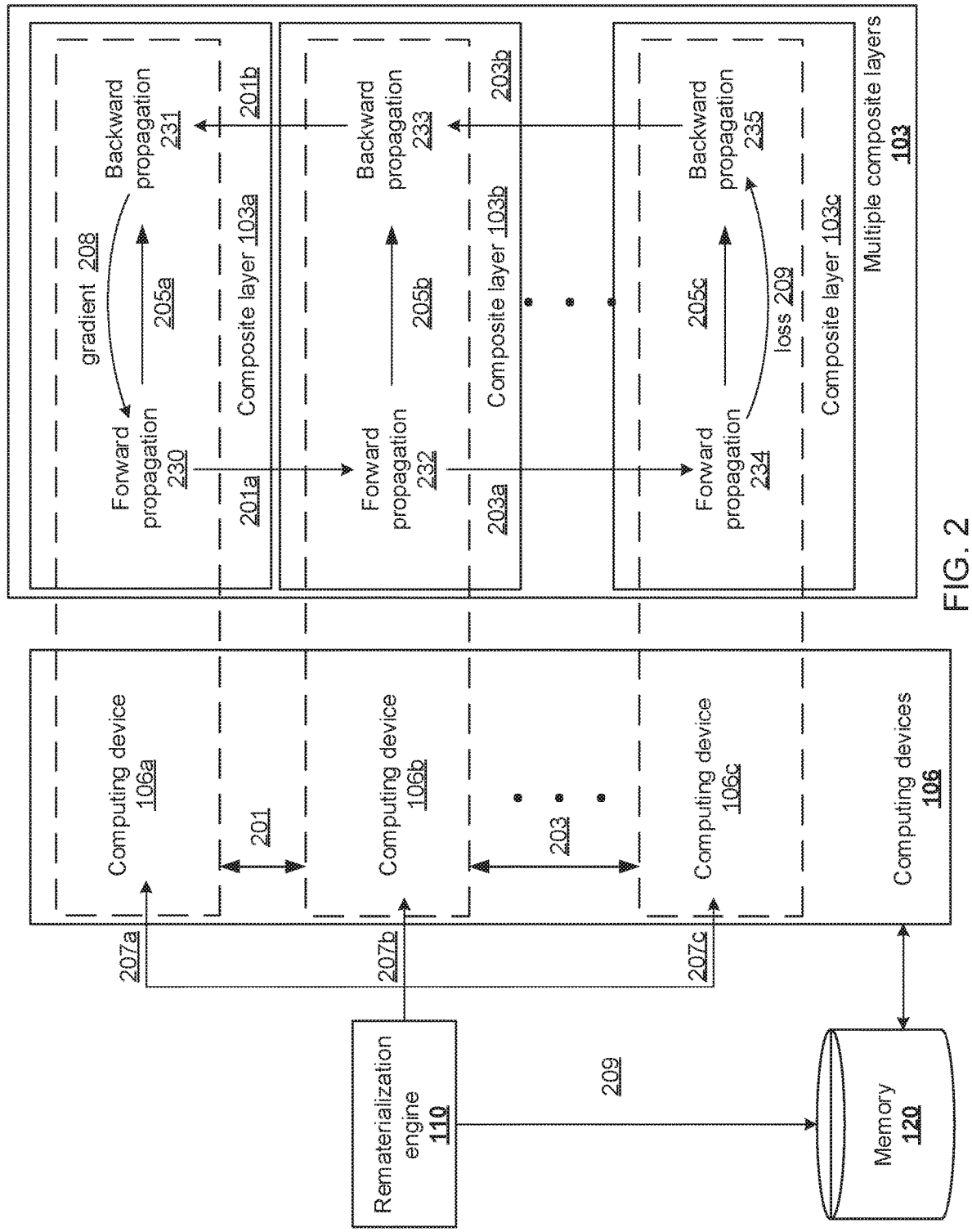
FIG. 2 illustrates an example process of training composite layers partitioned from an original neural network with a plurality of computing devices.

FIG. 2 illustrates an example process of training composite layers partitioned from an original neural network using a plurality of computing devices.

As shown in FIG. 2, the multiple composite layers 103 generated by the partitioning engine 104 include at least a first composite layer 103a, a second composite layer 103b and a third composite layer 103c.

Each composite layer 103a, 103b and 103c has two boundary layers and a plurality of internal layers. The two boundary layers of a composite layer are the first and the last layer in the sequence of the composite layer. The internal layers of a composite layer are the all layers except for the boundary layers of the composite layer. The first layer of the boundary layers of the first composite layer 103a is the first layer of the giant neural network 102. The second layer of the boundary layers of the last composite layer 103c is the last layer of the giant neural network 102. Even though the total number of composite layers shown in FIG. 2 is 3 for ease of illustration, the total number of composite layers partitioned from a giant neural network layer can be more than 3, for example, 10, 50 or more.

Each composite layer of the plurality of composite layers 103 is assigned to a respective computing device 106. As shown in FIG. 2, the first composite layer 103a is assigned to a first computing device 106a to perform operations defined within the first composite layer 103a, the second composite layer 103b is assigned to a second computing device 106b to perform operations defined within the second composite layer 103b, and the third composite layer 103c is assigned to a third computing device 106c to perform operations defined within the third composite layer 103c.

Each computing device 106 can have access to a common memory 120, or have its own memory independent to each other. The operations to train each composite layer 103 include a forward propagation defined by a respective composite forward computation function F and a backward propagation defined by a respective composite backpropagation function B, as described above.

As shown in FIG. 2, the first composite layer 103a can have operations defined by a forward propagation 230 and a backward propagation 231, the second composite layer 103b can have operations defined by a forward propagation 232 and a backward propagation 233, and the third composite layer 103c can have operations defined by a forward propagation 234 and a backward propagation 235.

The operations related to training each composite layer 103 such as obtaining intermediate variables, generating a soft-matrix, and/or optimizing learning rate during backpropagation, can also be assigned to respective computing devices to perform.

The system 100 can insert communication primitives, e.g., instructions, at each composite layer 103 that when executed by a computing device 106, can cause the device 106 to exchange data, e.g., an output activation or an output gradient, to another computing device assigned to a neighboring composite layer.

Generally, the first composite layer 103a receives a plurality of micro-batches 107 and processes each micro-batch using the composite forward computation function $F_0$. The output activation of $F_0$ is an input for $F_1$, the composite forward computation function for the next composite layer, i.e., 103b in the sequence. The composite layers 103 are chained in this manner until the composite forward computation function for the last composite layer $F_K$, assuming K partitions to the neural network 102, is processed, producing the output for the neural network 102. For the backward propagation, the system 100 traverses the composite layers 103 in the reverse order of the sequence, i.e., starting with the last composite layer and ending with the first composite layer.

Particularly, as shown in FIG. 2, the computing device 106a can communicate with the second computing device 106b through instructions 201 that cause a first data exchange 201a to be performed between devices in which the first computing device 106a sends the output activation of the last layer of boundary layers of the first composite layer 103a to the first layer of boundary layers of the second composite layer 103b as an input, and a second data exchange 201b to be performed between the same two devices in a manner that the second computing device 106b sends the output gradient of the first layer of boundary layers of the second composite layer 103b to the last layer of boundary layers of the first composite layer 103a as an input. Similarly, as shown in FIG. 2, the system can insert instructions 203 for communications between the second computing device 106b and the third computing device 106c to allow a third data exchange 203a of an output activation from the composite layer 103b to the composite layer 103c, and a fourth data exchange 203b of an output gradient from the composite layer 103c to the composite layer 103b.

When each computing device, e.g., 106a-106c is training a respective composite layer, e.g., 103a-103c, the rematerialization engine 110 can insert instructions that define operation schedules, i.e., 207a, 207b or 207c, to each computing device 103a, 103b or 103c, as shown in FIG. 2. The operation schedule can determine, at each time step of training, whether the outputs generated by a layer of any given composite layer should be saved for later use or recomputed when necessary later. In some implementations, the operation schedules for each computing device can be independent, i.e., a first schedule 207a for the first computing device 106a can be different from the second schedule 207b for the second computing device 106b regarding, at each time step of training, outputs of a layer to be saved or not. Alternatively, the operation schedules can be the same for all computing devices 106. For example, the operation schedules 207a, 207b and 207c can instruct each computing device 106 to store into the memory 120 the output activations of boundary layers of each composite layer 103, but to recompute the output activations of internal layers of each composite layer 103.

Particularly, the recomputation operations can be performed during backward propagation within each composite layer 103 by the assigned device 106. At each internal network layer in a composite layer 103, the computing device 106 assigned to the composite layer 103 can compute the gradient of the objective function (or loss function) with respect to the network parameters of the network layer. To compute the output gradient at each layer of a composite layer 103, an output activation at the layer is required as an input. For example, as shown in FIG. 2, output gradients generated from each backpropagation function of the backward propagation 231 for each layer in the composite layer 103a takes as input an output activation generated from each forward computation function of the forward propagation 230 for the layer in the composite layer 103a. The schedule 207a generated by the rematerialization engine 110 instructs the computing device 106a to, rather than caching each output activation for each forward computation function in the composite layer, recompute output activations at each layer of the composite layer 103a when the backward propagation 231 requires. In some implementations, the recomputation of an output activation in a preceding layer of a composite layer during backward propagation can be computed earlier without waiting for output gradient from a succeeding layer in the composite layer.

However, the rematerialization engine 110 of the system 100 can generate instructions 207 causing respective computing devices 106 to store the output activations into memory 120 for the boundary layers of each composite layer 103 instead of recomputing the forward computation functions for the boundary layers, because the forward computation function for the first layer of boundary layers of a composite layer 103 depends on output activation from network layers not in the composite layer. Specifically, a first layer of boundary layers in a second composite layer 103b receives input from a computing device, i.e., 106a, processing a preceding composite layer, i.e., 103a, requires the output activation of a second layer of boundary layers in the preceding composite layer 103a. Similarly, the output activation for the second layer of boundary layers of a composite layer 103b is input to a first layer of boundary layers in a succeeding composite layer 103c. Therefore, rather than recomputing the forward computation functions for these boundary layers, the system stores the respective output activations in memory 120.

Training a neural network 102 of L layers in a sequence refers to performing a forward pass followed by a backward pass through the neural network on one or more training examples in accordance with the architecture of the neural network. For example, as shown in FIG. 2, the forward propagations 230, 232 and 234 with corresponding data exchanges 201a and 203a combined sequentially form the forward pass for the neural network 102, the backward propagations 231, 233 and 235 with corresponding data exchanges 201b and 203b combined sequentially form the backward pass for the neural network 102.

In the forward pass, the training examples are processed through the neural network to obtain a final output activation. In other words, the system processes each training example of a micro-batch 107 through the L layers in the neural network 102 until an output activation is generated for the output layer of the neural network 102, i.e., the last layer of the boundary layers of the composite layer 103c. The system can then compute a loss 209 between the final output activation and the expected output activation for the neural network 102. In the backward pass, the system performs backpropagation operations at each network layer to compute an output gradient of an objective function, which serves as input to the succeeding network layer. Each backpropagation operation in each layer of the neural network layer takes as input an output activation of the current layer and an output gradient of a succeeding layer, to generate an output gradient with respect to the parameters of the current layer. For example, an internal layer of the composite layer 103b takes in an output activation 205b at the current layer calculated during forward pass, and an output gradient from a succeeding layer of the current layer. The system can obtain a final output gradient 208 in the first layer of the neural network after performing the backward pass through the neural network. The system can then update the neural network parameters of each network layer with the respective computed gradient for the network layer.

Figure 3:
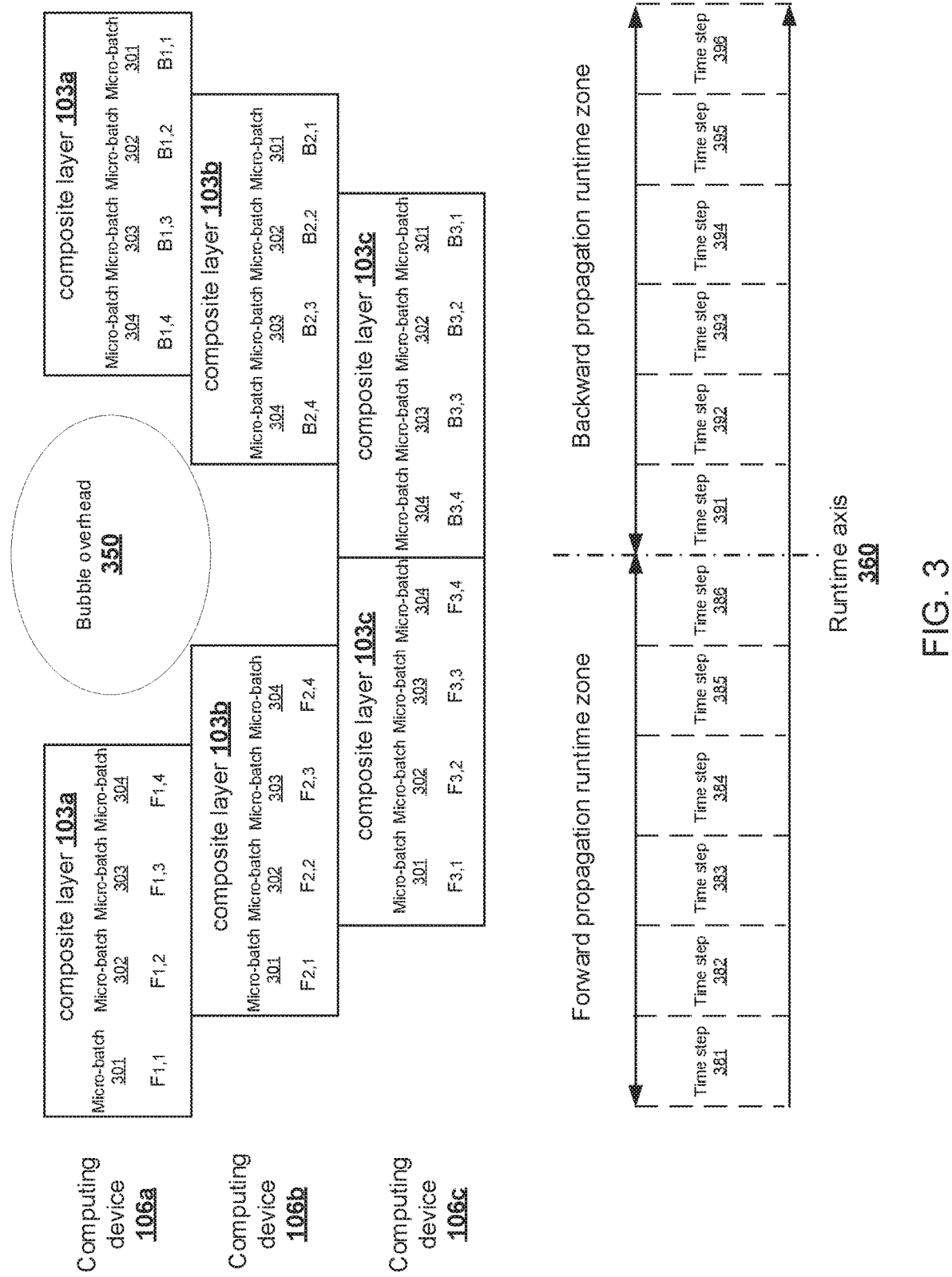
FIG. 3 illustrates an example of computing device usage when training a neural network using pipeline parallelism.

The recomputation technique described above reduces peak memory requirement for each computing device. Without recomputation, for a mini-batch of size N (i.e., training examples per mini-batch) across L layers of a neural network, the total cached output activations would require, at worst, O(N*L) memory. The peak memory usage can be further reduced for each computing device by training composite layers on micro-batches of training examples. As shown in FIG. 3, the system can divide a mini batch of training examples 105 into four micro-batches, i.e., 301-304, during the training of a giant neural network 102 to further reduce peak memory usage for each computing device.

By storing only the output activations of the boundary layers of all composite layers and operating on micro-batches, the peak memory requirement for training a giant neural network with L layers reduces to $$O\left(N + \frac{L}{K} * \frac{N}{T}\right),$$

where $$\frac{N}{T}$$

is the micro batch size of each micro-batch with T micro-batches split from a mini-batch of size N, and $$\frac{L}{K}$$

is the number of neural layers obtained from the L-layer giant neural network partitioned into K composite layers. Therefore, both the number of micro-batches T and the number of partitions K contribute to reducing the memory requirement for a single device while training the giant neural network, i.e., in general, more partitions and more micro-batches lead to smaller memory requirements for each device. For example, the system partitions a giant neural network 102 into 3 composite layers 103a, 103b and 103c, assigns computing devices 106a, 106b and 106c to train a respective composite layer based on micro-batches 301-304 divided from a mini-batch of training examples, as shown in FIGS. 2 and 3.

Partitioning a giant neural network can introduce some idle time, i.e., bubble overhead or winding down time, per computing device. The bubble overhead is $$O\left(\frac{K-1}{T+K-1}\right)$$

amortized over the number of mini-batches T in a mini-batch of size N. The system can make the devices even more efficient during training by scheduling recomputation operations on idle devices during the "winding down" phase. In some implementations, the bubble overhead can be negligible when M>4×K, for example, because recomputing composite forward activation functions within a preceding composite layer during the backward propagation can be scheduled earlier than output gradients from a succeeding composite layer are calculated, as described earlier.

By making use of recomputation, the system can train giant neural networks even with relatively small amounts of memory to process large composite layers, because the device is only required to store the activations for the boundary layers. The system makes a computing device that was previously incapable of training general networks due to memory restrictions capable of training giant neural networks.

Thus, during the training, the system can train neural networks more efficiently by incorporating high performance computation techniques such as computing in parallel using one or more computing devices.

For example, for a device assigned a composite layer k having three neural network layers and composite forward computation function $F_k = f_i \circ f_{i+1} \circ f_{i+2}$, when the device computes $F_k$ on the forward pass, the device can store in memory the output activations for $f_i$ and $f_{i+2}$ and not save the output of $f_{i+1}$. During backpropagation through the composite layer k, the assigned device can retrieve the stored outputs for $f_i$ and $f_{i+2}$ and recompute $f_{i+1}$. The system can process composite layers on devices having memory capacities that are not large enough to store the output activations for every network layer in a composite layer, but large enough to store the output activations of the boundary layers of the composite layer. The remaining forward computation functions are recomputed to obtain the outputs needed to calculate the gradient at each layer.

The system can select the order in which to process each micro-batch in the plurality of micro-batches divided from a mini-batch in any number of ways. For example, the system can select micro-batches in a sequence defined by the training examples, as shown in FIG. 3. For another example, the system can select micro-batches randomly until each micro-batch is processed by the device assigned to the first composite layer.

Training a neural network using the system is described as a series of operations the system performs or causes one or more devices to perform, over a period of time represented as a plurality of time-steps. The training process includes performing a forward pass and a backward pass. The time steps along runtime axis 360, as shown in FIG. 3, can be divided into a forward propagation runtime zone and a backward propagation runtime zone. The forward propagation runtime zone can include time steps 381-386, and the backward propagation runtime zone can include time steps 391-396.

The forward pass proceeds as follows: Let $F_{k,t}$ represent the composite forward computation function for composite layer k processing micro-batch t. The system can assign device k to train composite layer k. During the forward pass, the device (k+1) starts to compute $F_{k+1,t}$ as soon as the input for $F_{k+1,t}$ is available, i.e., as soon as it receives an input, i.e., the output of $F_{k,t}$ computed by device k. At the same time-step, the device k can start to compute $F_{k,t+1}$ based on micro-batch (t+1). Each device repeats this process for each micro-batch of a mini-batch to finish the forward pass.

For example, as shown in FIG. 3, $F_{1,1}$ represents the composite forward computation function for composite layer 103a based on micro batch 301. For another example in FIG. 3, $F_{3,4}$ represents the composite forward computation function for composite layer 103c based on micro batch 304. Once available and receives the output activation obtained from $F_{1,1}$ process by computing device 106a, the computing device 106b starts to compute the composite forward computation function $F_{2,1}$ based on micro-batch 301 for composite layer 103b.

FIG. 3 illustrates an example of computing device usage when training a neural network 102 using pipeline parallelism. The system using pipeline parallelism carries out a training process over a giant neural network 102 as a "cascade" of devices executing composite forward computation functions and composite backpropagation functions for respective composite layers with different micro-batches of training examples across a plurality of time-steps.

In the forward propagation runtime zone, at each initial time step a different device starts to compute the composite forward computation function for its assigned composite layer until every device is processing a different micro-batch. For example, the computing device 106b starts to compute $F_{2,1}$ at time step 382. For another example, the computing device 106c starts to compute $F_{3,3}$ at time step 385.

Then, for one or more time-steps in the runtime zone, every device is computing a composite forward computation function for a different composite layer and for a different micro-batch from each other device. For example, at time step 383, the computing device 106a is computing $F_{1,3}$, the computing device 106b is computing $F_{2,2}$ while the computing device 106c is computing $F_{3,1}$.

Later, the devices that started processing the micro-batches at earlier time-steps begin to finish processing all of the micro-batches split from a respective mini-batch, and the plurality of devices "winds down" until the last device computes the composite forward computation function for the last composite layer and the last micro-batch. In the forward propagation runtime zone, for example, the bubble overhead 350 for computing device 106a lasts for time steps 385 and 386 in the forward propagation runtime zone. For another example, the bubble overhead 350 for computing device 106b lasts for time steps 381 and 386 in the forward propagation runtime zone.

During the winding down portion of the forward pass, the system can schedule recomputation operations on the devices that have finished processing in preparation for the backpropagation phase. For example, in the bubble overhead of computing device 106b at time step 386, the system can schedule the device 106b to recompute output activations of the composite layer 103b before backpropagation process reaches the composite layer 103b.

At some time step during the forward pass, a device k can receive an input to compute $F_k$. For each device that is not assigned to the first composite layer of the neural network, the input to compute $F_k$ for a micro-batch t is the output activation of $F_{k-1,t}$. For the device assigned to the first composite layer, the input is a micro-batch t of training examples, and optionally additional parameters for initializing training.

The forward pass of the neural network based on a mini-batch of training examples, or the forward propagation runtime zone, ends when the last device computes the composite forward computation function for the last composite layer and on the last micro-batch and the system computes the final loss. In some implementations, the system can concatenate the output activations obtained for each micro-batch during the forward pass of the mini-batch and compute the final loss. In some implementations, the last device assigned to the last composite layer concatenates the output activations and computes the final loss. For example, the forward propagation runtime zone ends at the end of time step 386. At the following time steps, the system begins backpropagation of the neural network to compute the error between the output and the expected output, of the neural network with the current network parameters at each network layer. The following time steps can also be referred to as the backward propagation runtime zone in the runtime axis 360, as shown in FIG. 3.

The system can compute gradients for each micro-batch based on the same network parameters as the forward pass. The backpropagation of the neural network mirrors the forward pass: beginning at the next time-step following the end of the forward pass, the last device computes the composite backpropagation function for the last composite layer on the last micro-batch in the plurality of micro-batches. As shown in FIG. 3, the first time step in the backward propagation runtime zone is time step 391, wherein the last computing device 106c computes the composite backpropagation function for the last composite layer 103c based on the last micro batch 304 of all micro-batches.

The backward pass proceeds as follows: Let $B_{k,t}$ represent the composite backpropagation function for composite layer k processing micro-batch t. During backpropagation, the device (k−1) starts to compute $B_{k-1,t}$ as soon as it receives an input, i.e., the output gradient of device k computing $B_{k,t}$. At the same time-step, the device k can start to compute $B_{k,t-1}$. Each device repeats this process for each micro-batch of a mini-batch to finish the backward pass.

For example, as shown in FIG. 3, $B_{3,4}$ represents the composite backpropagation function for composite layer 103c based on micro batch 304. For another example in FIG. 3, $B_{2,1}$ represents the composite backpropagation function for composite layer 103b based on micro batch 301. Once available and receives the output gradient obtained from $B_{2,3}$ processed by computing device 106b, the computing device 106a starts to compute the composite backpropagation function $B_{1,3}$ based on micro-batch 303 for the composite layer 103a.

Similar to the forward pass, the devices "cascade" with a new device beginning to process a respective input gradient at each time-step, until all devices are computing a backpropagation for a different composite layer and for a different micro-batch before eventually winding down. For example, the computing device 106b starts to compute $B_{2,4}$ at time step 392. For another example, the computing device 106a starts to compute $B_{1,4}$ at time step 393.

At each time step in the backward propagation runtime zone, a device k can receive an input, if available, to compute $B_k$. For each device that is not assigned to the last composite layer of the neural network, the input in the backpropagation to compute $B_k$ includes an output gradient of $B_{k+1,t}$ computed by the device k+1, and an output activation of each forward computation function $f_i$ obtained at the same layer of the composite layer k.

Then for one or more time-steps in the backward propagation runtime zone, every device is computing a composite backpropagation function for a different composite layer and for a different micro-batch from each other device. For example, at time step 394, the computing device 106a is computing $B_{1,3}$, the computing device 106b is computing $B_{2,2}$ while the computing device 106c is computing $B_{3,1}$.

Likewise in the backward propagation runtime zone, the devices that started processing the micro-batches at earlier time-steps begin to finish processing all of the micro-batches split from a respective mini-batch, and the plurality of devices "winds down" until the first device computes the composite backpropagation function for the first composite layer and the first micro-batch. For example, in the backward propagation runtime zone, the bubble overhead 350 for computing device 106a lasts for time steps 391 and 392 in the forward propagation runtime zone. For another example, the bubble overhead 350 for computing device 106b lasts for time steps 391 and 396 in the forward propagation runtime zone.

In combination of all time steps in the runtime axis 360, the total bubble overhead 350 for computing device 106a includes time steps 385, 386, 391 and 392. The total bubble overhead 350 for computing device 106b for computing device includes time steps 381, 386, 391 and 396. The total bubble overhead for computing device 106c includes time steps 381, 382, 395 and 396.

The backpropagation of the mini-batch for the neural network ends when the first device processes the backpropagation function of the first micro-batch for the first composite layer. For example, the backward propagation runtime zone ends at the end of time step 396. At the next time step, the system can apply gradients to update network parameters for each composite layer only at the end of each mini-batch, maintaining the same synchronous nature of gradient descent that is independent of the number of composite layers partitioned.

A detail explanation of FIG. 3 follows. A giant neural network is partitioned into 3 composite layers 103a, 103b and 103c, forming a sequence. Each of the 3 composite layers is assigned to a respective computing device out of four available devices 106a, 106b and 106c, i.e., composite layer 103a is assigned to computing device 106a, composite layer 103b is assigned to computing device 106b, and composite layer 103c is assigned to computing device 106c. Prior to the time step 381, the system can receive a mini-batch 105 and split the mini-batch into micro-batches 301, 302, 303 and 304, representing four micro-batches in this example.

At time step 381, device 106a computes the composite forward computation function for composite layer 103a based on micro-batch 301, i.e., device 106a computes $F_{1,1}$.

At time step 382, device 106b receives the output of $F_1$, and computes the composite forward computation function for composite layer 103b for micro-batch 301, i.e., device 106b computes $F_{2,1}$. The input to compute $F_{2,1}$ is the output activation of $F_{1,1}$, which was previously computed by device 106a at time step 381. Also at time step 382, device 106a receives micro-batch 302 and computes $F_{1,2}$ on micro-batch 302.

At time step 383, all 3 devices are computing a composite activation function for a micro-batch: Device 106c receives the output of $F_{2,1}$, and computes $F_{3,1}$; device 106b receives micro-batch 302 and the output of $F_{1,2}$, and computes $F_{2,2}$; device 106a receives micro-batch 303 and computes $F_{1,3}$.

At time step 384, device 106a is computing $F_{1,4}$, device 106b is computing $F_{2,3}$, device 106c is computing $F_{3,2}$.

At the end of time step 384, the device 106a finishes the forward pass for a mini-batch, having computed the composite forward computation function for the assigned composite layer 103a for each micro-batch split from the mini-batch.

Similar at the end of time step 385, the device 106b finishes the forward pass for a mini batch, having computed the composite forward computation function for the assigned composite layer 103b for each micro-batch split from the mini-batch.

At the end of time step 386, device 106c concatenates the composite activation outputs for each micro-batch, and computes a final loss.

From time step 391 on, the system begins the backpropagation to compute the gradients for each mini-batch. At time-step 391, device 106c computes the gradient for composite layer 103c on micro-batch 304, i.e., device 106c computes $B_{3,4}$.

At time step 392, device 106b receives the gradient output of $B_{3,4}$ and computes the composite backpropagation function for composite layer 103b for micro-batch 304, i.e., device 106b computes $B_{2,4}$. Also at time-step 392, device 106c computes $B_{3,3}$ for micro-batch 303.

At time step 393, all 3 devices are computing a composite backpropagation function for a micro-batch: Device 106a receives the gradient output of $B_{2,4}$ and computes $B_{1,4}$; device 106b receives the gradient output of $B_{3,3}$ and computes $B_{2,3}$; and device 106c and computes $B_{3,2}$.

At time step 394, device 106c is computing $B_{3,1}$, device 106b is computing $B_{2,2}$, device 106a is computing $B_{1,3}$.

At the end of time step 394, the device 103c begins finishing the backpropagation for a mini-batch, having computed the backpropagation function for the assigned composite layer 103c on each micro-batch split from the mini-batch.

Similarly at the end of time step 395, the device 103b begins finishing the backpropagation for a mini-batch, having computed the backpropagation function for the assigned composite layer 103b on each micro-batch split from the mini-batch At the end of time step 396, all of the network parameters are updated with the gradients obtained during backpropagation, simultaneously. The process described for time-steps in FIG. 3 can be repeated for each mini-batch in a training set. The process described above can also be performed in parallel across multiple devices and for multiple mini-batches in a set of training data.

The bubble overhead of the forward pass and backpropagation as discussed above can made more efficient in several ways. First, idle computing time as the number of devices finish computing a composite function on a micro-batch can be amortized by increasing the number of micro-batches split from a mini-batch. Increasing the number of micro-batches split from a mini-batch also reduces the memory size requirement for each device, as discussed above. The system can also schedule recomputation of activations for non-boundary internal network layers for later composite layers in the neural network. For example in FIG. 3, device 106c compute $F_{3,4}$ at time-step 386, devices 106a and 106b can begin to recompute the internal layer forward computation functions for composite layer 103c, which will be the first composite layer processed during the backpropagation pass of training.

The system can also reduce idle computing time by partitioning the neural network into composite layers that each have similar computational requirements. The system can also assign computationally more intensive composite layers to devices with greater computing resources. In some implementations, the system can partition the neural network by performing an initial partition to obtain a set of composite layers, and then obtain a predicted computational cost for performing either a forward pass or a backward pass through each composite layer. Next the system can compute a variance between the computational costs for all of the composite layers in the set, and determine if the variance falls within a predetermined threshold. If the variance does not fall within the threshold, e.g., because the relative computational costs between composite layers are too dissimilar, then the system can repeatedly partition the neural network to obtain different sets of composite layers until the system obtains a set of composite layers whose variance meets the threshold. The net effect of tuning composite layers and assigning devices based on computational capability is reducing the time a device has to wait to receive required data from a neighboring device.

Figure 4:
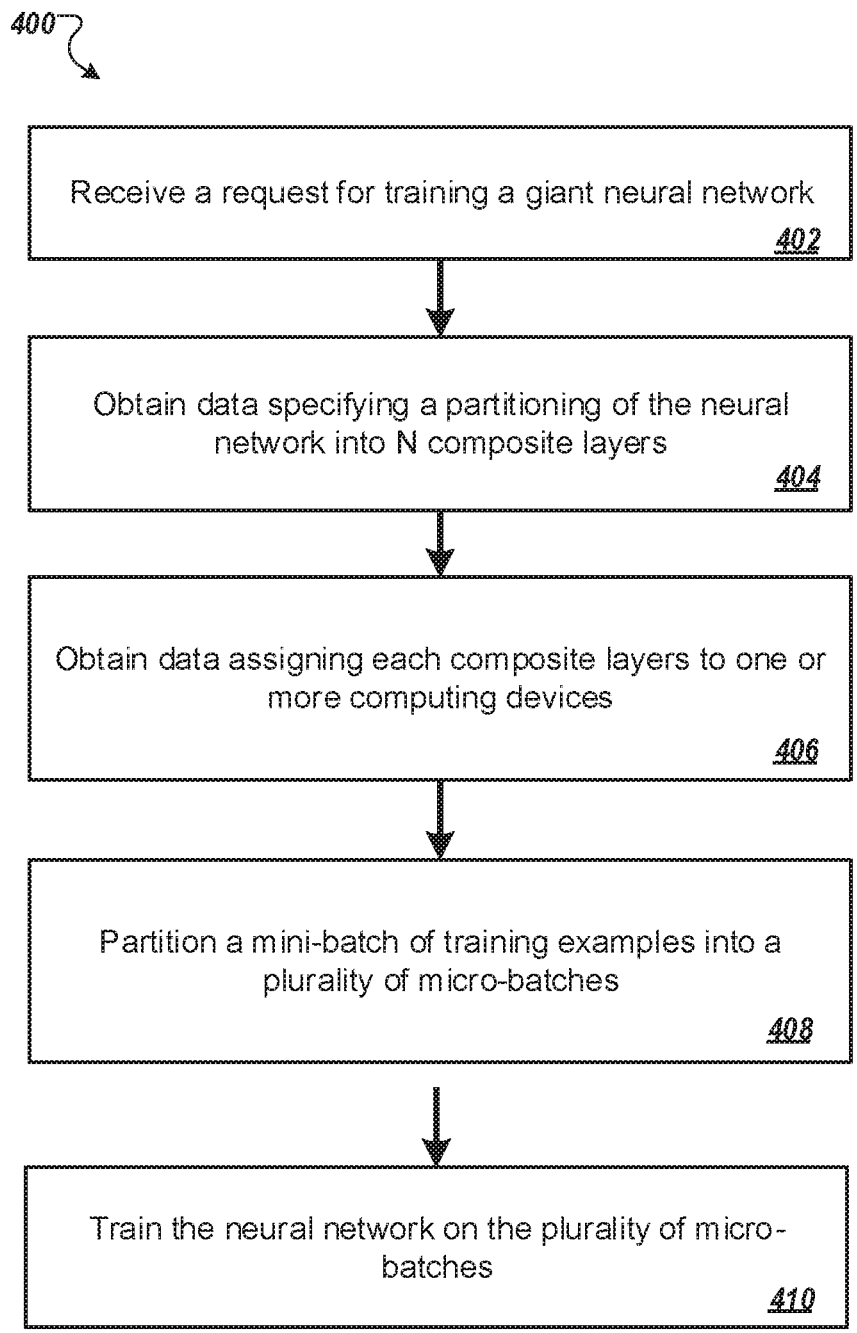
FIG. 4 illustrates an example process for partitioning a neural network and mini-batches of training examples.

FIG. 4 illustrates an example process 400 for partitioning a neural network and mini-batches of training examples. For convenience, the process 400 will be described as being performed by a system of one or more computers located in one or more locations. For example, a pipeline parallelism system, e.g., the system 100 of FIG. 1, appropriately programmed, can perform the process 400.

The system first receives a request for training a giant neural network (402). The giant neural network includes L neural network layers arranged in a sequence.

Next, the system obtains data specifying a partitioning of the neural network into N composite layers (404). Each composite layer of the N composite layers includes a disjoint subsequence of neural network layers in the giant neural network, as described earlier. The total partition number can be 2, 10, 50 and more.

Then, the system obtains data assigning each composite layers to one or more computing devices (406). Each computing device, as described in FIG. 1, performs operations associated with its assigned composite layer when training the giant neural network.

The system partitions a mini-batch of training examples into a plurality of micro-batches (408). The total number of micro-batches in a mini-batch of training examples can be 5, 30 and more. When taking as input a plurality of mini-batches of training examples, the system can divide each mini-batch into a same number of micro-batches of training examples.

Finally, the system trains the neural network on the plurality of micro-batches (410). The training process is described in more detail below with reference to FIG. 5.

Figure 5:
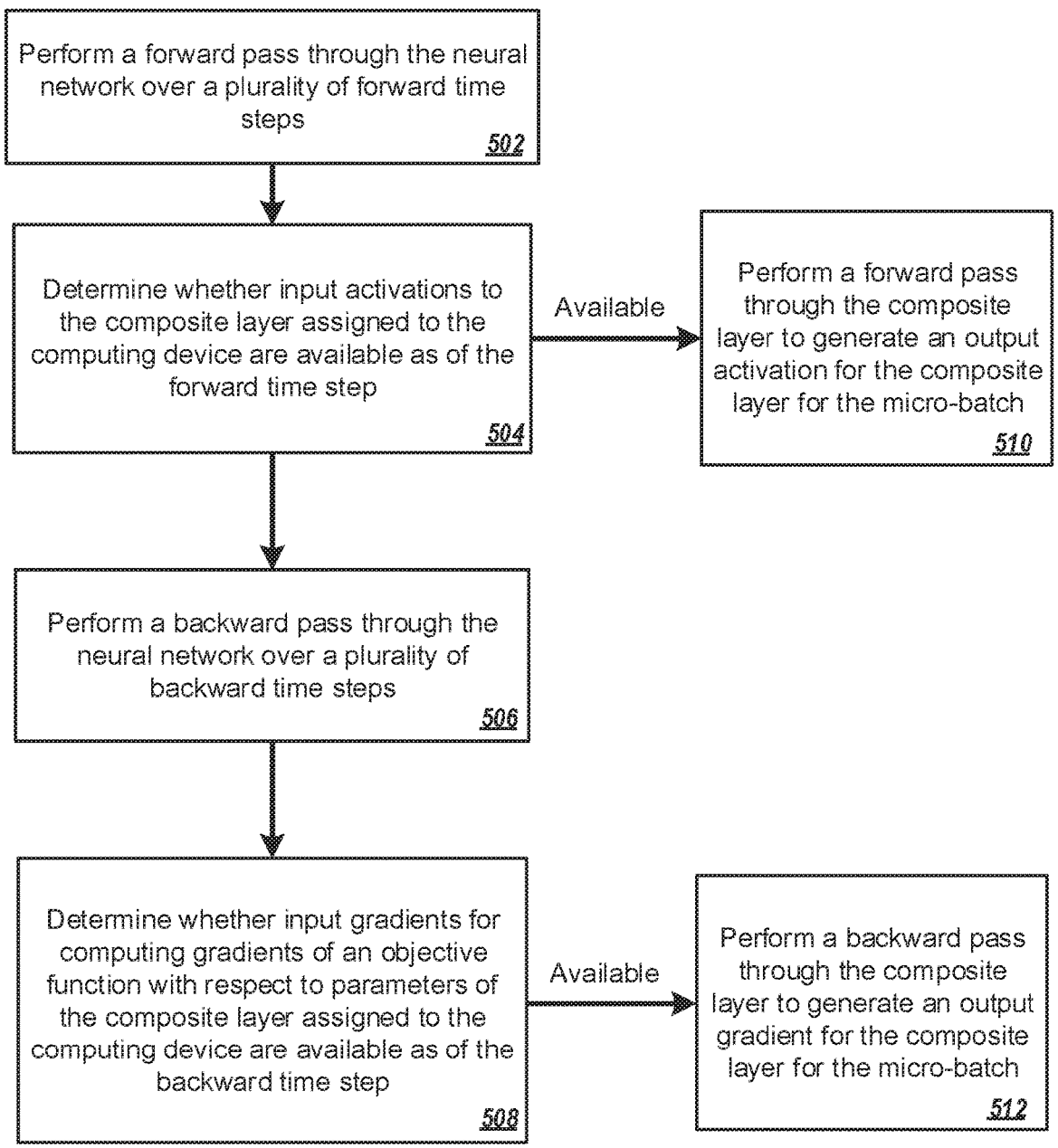
FIG. 5 illustrates an example process for training the neural network based on the partitioning of the neural network and mini-batches.

FIG. 5 illustrates an example process 500 for training the neural network based on the partitioning of the neural network and mini-batches. For convenience, the process 500 will be described as being performed by a system of one or more computers located in one or more locations. For example, a pipeline parallelism system, e.g., the system 100 of FIG. 1, appropriately programmed, can perform the process 500.

The system first performs a forward pass through the neural network over a plurality of forward time steps (502). As described earlier, the system starts the forward pass by instructing a first computing device to compute composite forward computation functions based on a first micro-batch. Then the rest of computing devices start to compute composite forward computation functions of respectively assigned composite layers when receiving input data. The input data for a composite layer in a forward pass includes micro-batches if the composite layer is the first composite layer, or input activations for succeeding composite layers.

During the forward pass, the system determines, at each forward time step and for each composite layer, whether input activations to the composite layer assigned to the corresponding computing device are available as of the forward time step (504). If the input activations are available, the system performs a forward pass through the composite layer to generate an output activation for the composite layer for the micro-batch (510) using the available input activations.

The system instructs computing devices to perform the forward pass until output activations have been computed for each micro-batch of training examples for a final composite layer in the sequence. At the end of forward pass, the system computes a final loss by concatenating the output activations obtained for each micro-batch. Alternatively, the last device assigned to the last composite layer concatenates the output activations and computes the final loss.

The system then performs a backward pass through the neural network over a plurality of backward time steps (506). The system instructs computing devices to perform the backward pass, mirroring the forward pass such that the last computing device assigned to the last composite layer starts to compute backpropagation functions based on the last micro-batch using the same parameters in the forward pass. Then computing devices assigned with preceding composite layers start to compute backpropagation functions when receiving input data. The input data for a composite layer in a backward pass includes a final loss obtained at the end of the forward pass if the composite layer is the last composite layer, or input gradients of an objective function for preceding composite layers.

During the backward pass, the system determines whether input gradients for computing gradients of an objective function with respect to parameters of the composite layer assigned to the computing device are available as of the backward time step (508). If the input gradients are available, the system performs a backward pass through the composite layer to generate an output gradient for the composite layer for the micro-batch (512) using the available input gradients.

Within each composite layer during the backward pass, the system adopts recomputation techniques to reduce peak memory cost in each computing device. The recomputation of forward computation functions in each layer of a composite layer can be scheduled for the assigned computing device to perform prior to the backpropagation in the composite layer. The details of recomputation is described above.

The system stops the backward pass when the first device processes the backpropagation function of the first micro-batch for the first composite layer. At the next time step, the system applied gradients to update network parameters for each composite layer using synchronous gradient descent method as described earlier.

The system can use batch normalization in the neural network. In some implementations, the system can compute the sufficient statistics of inputs during training over each micro-batch, and replicas, as necessary. The system can also track the moving average of the sufficient statistics using an entire mini-batch for use during evaluation.

The system can "scale up" existing neural networks to improve model accuracy. In some implementations, the system can take an existing neural network having network layers with multiple filters, and double the number of filters at each layer. In some implementations, the system can add more devices for training a neural network while avoiding model generalization issues associated with pure data parallelism approaches having large global mini-batch sizes. In some implementations, the system can add branches to an existing neural network to form a multi-branch neural network having a respective branching activation function for each branch in a network layer of the neural network. The system can scale up existing neural networks without changing hyperparameters or pre-processing input data. Scaling up a neural network can increase the accuracy of the trained model.

Once the system trains the neural network, the system can provide data specifying the trained neural network for use in processing new network inputs. That is, the system can output the trained values of the network parameters for later use in processing inputs using the trained neural network, e.g., by outputting to a user device or by storing in a memory accessible to the system.

Alternatively or in addition to outputting the trained neural network data, the system can instantiate an instance of the neural network having the trained values of the network parameters, and receive inputs to be processed and use the trained neural network to process the received inputs to generate outputs and then provide the generated outputs in respect to the received inputs. The system can receive network inputs through an application programming interface ("API") offered by the system. The trained neural network can be used to process a variety of machine learning tasks, such as object detection, image segmentation, and natural language processing.

The system can provide data specifying the trained neural network to initialize training for a different neural network to be trained on different training examples, i.e., by transfer learning. Through transfer learning of a new neural network, the system can speed up training of different models for different machine learning tasks without sacrificing model accuracy.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Implementations of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being or may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
    one or more computers and one or more storage devices storing instructions that are operable, when executed by the one or more computers, to cause the one or more computers to perform operations, comprising:
    obtaining data specifying a partitioning of a neural network having multiple network layers into N composite layers that form a sequence of composite layers, wherein each composite layer comprises a distinct plurality of layers from the multiple network layers of the neural network;
    obtaining data assigning each of the N composite layers to one or more computing devices from a set of N computing devices;
    partitioning a mini-batch of training examples for training the neural network into a plurality of micro-batches; and
    training the neural network on the mini-batch of training examples, comprising:
        performing a forward pass through the neural network over a plurality of forward time steps until output activations have been computed for each micro-batch for a final composite layer in the sequence, comprising, at a particular forward time-step:
            determining whether, for any of the plurality of micro-batches, input activations to a first composite layer assigned to a first computing device are available as of the particular forward time-step,
            in response to determining that the input activations to the composite layer assigned to the first computing device are available as of the forward time-step for a first micro-batch, performing, at the first computing device, a forward pass through the first composite layer assigned to the first computing device using the available input activations for the first micro-batch to generate output activations for the first composite layer for the first micro-batch,
            determining whether input activations to another composite layer that follows the first composite layer and is assigned to another computing device are available as of the particular forward time-step, wherein the input activations to the other composite layer are output activations from the first composite layer for another micro-batch, and
            in response to determining that the input activations to the other composite layer are available as of the particular forward time-step for the other micro-batch, while performing, at the first computing device, the forward pass through the first composite layer using the available input activations for the first micro-batch, performing, at the other computing device, the forward pass through the other composite layer using the available input activations for the other micro-batch,
        performing a backward pass through the neural network over a plurality of backward time steps until output gradients have been computed for each micro-batch for a first composite layer in the sequence, comprising, at a particular backward time-step:
            determining whether, for any of the plurality of micro-batches, gradient inputs for computing gradients of an objective function with respect to parameters of a second composite layer assigned to a second computing device are available as of the particular backward time-step, and in response to determining that input gradients to the second composite layer assigned to the second computing device are available as of the particular backward time-step for a second micro-batch, performing, at the second computing device, a backward pass through the second composite layer assigned to the second computing device using the available input gradients for the second micro-batch to generate output gradients for the second composite layer for the second micro-batch, determining whether input gradients to another composite layer that precedes the second composite layer and is assigned to another computing device are available as of the particular backward time-step, wherein the input gradients to the other composite layer are output gradients from the second composite layer for another micro-batch, and in response to determining that the input gradients to the other composite layer are available as of the particular backward time-step for the other micro-batch, while performing, at the second computing device, the backward pass through the second composite layer using the available input gradients for the second micro-batch, performing, at the other computing device, the backward pass through the other composite layer using the available input gradients for the other micro-batch;

for each composite layer, accumulating, by the respective computing device assigned to the respective composite layer and after performing the backward pass for all of the plurality of micro-batches of the mini-batch, respective gradients computed by the computing device for the respective composite layer for all of the plurality of micro-batches of the mini-batch to generate respective accumulated gradients for the composite layer, and for each composite layer, updating, by the respective computing device assigned to the respective composite layer, parameters of the respective composite layer using the respective accumulated gradients.

2. The system of claim 1, wherein, for the first composite layer in the sequence of composite layers, the input activations for a given micro-batch are the training examples in the micro-batch and, for each other composite layer in the sequence, the input activations for the given micro-batch are output activations of a preceding composite layer in the sequence for the given micro-batch.

3. The system of claim 1, wherein, for the last composite layer in the sequence of composite layers, the input gradients for the given micro-batch are the output activations of the last composite layer for the given micro-batch and, for each other composite layer in the sequence, the input gradients for the given micro-batch are the output gradients of the following composite layer in the sequence for the given micro-batch.

4. The system of claim 1, wherein the neural network comprises between 1 million and 2 billion network parameters across the multiple network layers of the neural network.

5. The system of claim 1,
wherein for each composite layer, the plurality of distinct network layers for the composite layer comprises a first boundary layer that receives the activation inputs for the composite layer and a second boundary layer that generates the activation output for the composite layer, wherein performing, at the first computing device, the forward pass through the first composite layer assigned to the first computing device using the available input activations for the first micro-batch to generate the output activations for the first composite layer for the first micro-batch, comprises:

computing, for each internal network layer in the plurality of distinct layers of the first composite layer, an internal activation operation; and storing, at the first computing device, at least one of: a first internal output activation from a first internal activation operation for a first boundary layer of the first composite layer or a second internal output activation from a second internal activation operation for a second boundary layer of the first composite layer; and wherein performing, at the first computing device, the backward pass through the first composite layer assigned to the first computing device using the available input gradients for the first micro-batch to generate the output gradients for the first composite layer for the first micro-batch comprises:

retrieving any stored internal output activation for any of the internal layers in the first composite layer, and recomputing the respective internal activation operation for all internal layers in which the output activation for the internal layer was not stored and retrieved.

6. The system of claim 1, wherein the micro-batches comprise the same number of training examples.

7. The system of claim 1, wherein the operations further comprise generating the partitioning of the multiple neural network layers into the N composite layers, comprising:

partitioning the multiple neural network layers into a first set of N composite layers;

determining that a variance between respective computational costs for each composite layer in the first set of N composite layers does not fall within a predetermined threshold, wherein the computational cost for a composite layer in the first set of N composite layers is a measure of one or more computational requirements for executing one or both of the forward pass or backward pass through the neural network; and in response to determining that the variance between respective computational costs for each composite layer in the first set of N composite layers does not fall within the predetermined threshold, repartitioning the multiple neural network layers into a second set of N composite layers.

8. The system of claim 1, wherein at any forward time step at which two or more computing devices are performing the forward pass through the neural network, the two or more computing devices operate in parallel.

9. The system of claim 1, wherein at any backward time step at which two or more computing devices are performing the backward pass through the neural network, the two or more computing devices operate in parallel.

10. The system of claim 1, wherein the operations further comprise:

providing, by the first computing device, the output activations for the first composite layer for the first micro-batch to another computing device, wherein the other computing device is assigned a neighboring composite layer that succeeds the first composite layer in the sequence of composite layers.

11. A method comprising:

obtaining data specifying a partitioning of a neural network having multiple network layers into N composite layers that form a sequence of composite layers, wherein each composite layer comprises a distinct plurality of layers from the multiple network layers of the neural network;

obtaining data assigning each of the N composite layers to one or more computing devices from a set of N computing devices;

partitioning a mini-batch of training examples for training the neural network into a plurality of micro-batches; and training the neural network on the mini-batch of training examples, comprising:

performing a forward pass through the neural network over a plurality of forward time steps until output activations have been computed for each micro-batch for a final composite layer in the sequence, comprising, for a particular forward time-step:

determining whether, for any of the plurality of micro-batches, input activations to the first composite layer assigned to a first computing device are available as of the particular forward time-step, in response to determining that the input activations to the composite layer assigned to the first computing device are available as of the particular forward time-step for a first micro-batch, performing, at the first computing device, a forward pass through the first composite layer assigned to the first computing device using the available input activations for the first micro-batch to generate output activations for the composite layer for the first micro-batch, determining whether input activations to another composite layer that follows the first composite layer and is assigned to another computing device are available as of the particular forward time-step, wherein the input activations to the other composite layer are output activations from the first composite layer for another micro-batch, and in response to determining that the input activations to the other composite layer are available as of the particular forward time-step for the other micro-batch, while performing, at the first computing device, the forward pass through the first composite layer using the available input activations for the first micro-batch, performing, at the other computing device, the forward pass through the other composite layer using the available input activations for the other micro-batch, performing a backward pass through the neural network over a plurality of backward time steps until output gradients have been computed for each micro-batch for a first composite layer in the sequence, comprising, at a particular backward time-step:

determining whether, for any of the plurality of micro-batches, gradient inputs for computing gradients of an objective function with respect to parameters of a second composite layer assigned to a second computing device are available as of the particular backward time-step, and in response to determining that input gradients to the second composite layer assigned to the second computing device are available as of the particular backward time-step for a second micro-batch, performing, at the second computing device, a backward pass through the second composite layer assigned to the second computing device using the available input gradients for second micro-batch to generate output gradients for the second composite layer for the second micro-batch, determining whether input gradients to another composite layer that precedes the second composite layer and is assigned to another computing device are available as of the particular backward time-step, wherein the input gradients to the other composite layer are output gradients from the second composite layer for another micro-batch, and in response to determining that the input gradients to the other composite layer are available as of the particular backward time-step for the other micro-batch, while performing, at the second computing device, the backward pass through the second composite layer using the available input gradients for the second micro-batch, performing, at the other computing device, the backward pass through the other composite layer using the available input gradients for the other micro-batch;

for each composite layer, accumulating, by the respective computing device assigned to the respective composite layer and after performing the backward pass for all of the plurality of micro-batches of the mini-batch, respective gradients computed by the computing device for the respective composite layer for all of the plurality of micro-batches of the mini-batch to generate respective accumulated gradients for the composite layer, and for each composite layer, updating, by the respective computing device assigned to the respective composite layer, parameters of the respective composite layer using the respective accumulated gradients.

12. The method of claim 11, wherein, for the first composite layer in the sequence of composite layers, the input activations for a given micro-batch are the training examples in the micro-batch and, for each other composite layer in the sequence, the input activations for the given micro-batch are output activations of a preceding composite layer in the sequence for the given micro-batch.

13. The method of claim 11, wherein, for the last composite layer in the sequence the input gradients for the given micro-batch are the output activations of the last composite layer for the given micro-batch and, for each other composite layer in the sequence, the input gradients for the given micro-batch are the output gradients of the following composite layer in the sequence for the given micro-batch.

14. The method of claim 11, wherein for each composite layer, the plurality of distinct network layers for the composite layer comprises a first boundary layer that receives the activation inputs for the composite layer and a second boundary layer that generates the activation output for the composite layer, wherein performing, at the first computing device, the forward pass through the first composite layer assigned to the first computing device using the available input activations for the first micro-batch to generate the output activations for the first composite layer for the first micro-batch, comprises:

computing, for each internal network layer in the plurality of distinct layers of the first composite layer, an internal activation operation; and storing, at the first computing device, at least one of: a first internal output activation from a first internal activation operation for a first boundary layer of the first composite layer or a second internal output activation from a second internal activation operation for a second boundary layer of the first composite layer; and wherein performing, at the first computing device, the backward pass through the first composite layer assigned to the first computing device using the available input gradients for the first micro-batch to generate the output gradients for the first composite layer for the first micro-batch comprises:

retrieving any stored internal output activation for any of the internal layers in the first composite layer, and recomputing the respective internal activation operation for all internal layers in which the output activation for the internal layer was not stored and retrieved.

15. The method of claim 11, wherein the method further comprises generating the partitioning of the multiple neural network layers into the N composite layers, comprising:

partitioning the multiple neural network layers into a first set of N composite layers;

determining that a variance between respective computational costs for each composite layer in the first set of N composite layers does not fall within a predetermined threshold, wherein the computational cost for a composite layer in the first set of N composite layers is a measure of one or more computational requirements for executing one or both of the forward pass or backward pass through the neural network; and in response to determining that the variance between respective computational costs for each composite layer in the first set of N composite layers does not fall within the predetermined threshold, repartitioning the multiple neural network layers into a second set of N composite layers.

16. One or more non-transitory computer-readable storage media encoded with instructions that, when executed by one or more computers, cause the one or more computers to perform operations, operations comprising:

obtaining data specifying a partitioning of a neural network having multiple network layers into N composite layers that form a sequence of composite layers, wherein each composite layer comprises a distinct plurality of layers from the multiple network layers of the neural network;

obtaining data assigning each of the N composite layers to one or more computing devices from a set of N computing devices;

partitioning a mini-batch of training examples for training the neural network into a plurality of micro-batches; and training the neural network on the mini-batch of training examples, comprising:

performing a forward pass through the neural network over a plurality of forward time steps until output activations have been computed for each micro-batch for a final composite layer in the sequence, comprising, for a particular forward time-step:

determining whether, for any of the plurality of micro-batches, input activations to the first composite layer assigned to a first computing device are available as of the particular forward time-step, in response to determining that the input activations to the composite layer assigned to the first computing device are available as of the particular forward time-step for a first micro-batch, performing, at the first computing device, a forward pass through the first composite layer assigned to the first computing device using the available input activations for the first micro-batch to generate output activations for the composite layer for the first micro-batch, determining whether input activations to another composite layer that follows the first composite layer and is assigned to another computing device are available as of the particular forward time-step, wherein the input activations to the other composite layer are output activations from the first composite layer for another micro-batch, and in response to determining that the input activations to the other composite layer are available as of the particular forward time-step for the other micro-batch, while performing, at the first computing device, the forward pass through the first composite layer using the available input activations for the first micro-batch, performing, at the other computing device, the forward pass through the other composite layer using the available input activations for the other micro-batch, performing a backward pass through the neural network over a plurality of backward time steps until output gradients have been computed for each micro-batch for a first composite layer in the sequence, comprising, at a particular backward time-step:

determining whether, for any of the plurality of micro-batches, gradient inputs for computing gradients of an objective function with respect to parameters of a second composite layer assigned to a second computing device are available as of the particular backward time-step, and in response to determining that input gradients to the second composite layer assigned to the second computing device are available as of the particular backward time-step for a second micro-batch, performing, at the second computing device, a backward pass through the second composite layer assigned to the second computing device using the available input gradients for second micro-batch to generate output gradients for the second composite layer for the second micro-batch, determining whether input gradients to another composite layer that precedes the second composite layer and is assigned to another computing device are available as of the particular backward time-step, wherein the input gradients to the other composite layer are output gradients from the second composite layer for another micro-batch, and in response to determining that the input gradients to the other composite layer are available as of the particular backward time-step for the other micro-batch, while performing, at the second computing device, the backward pass through the second composite layer using the available input gradients for the second micro-batch, performing, at the other computing device, the backward pass through the other composite layer using the available input gradients for the other micro-batch;

for each composite layer, accumulating, by the respective computing device assigned to the respective composite layer and after performing the backward pass for all of the plurality of micro-batches of the mini-batch, respective gradients computed by the computing device for the respective composite layer for all of the plurality of micro-batches of the mini-batch to generate respective accumulated gradients for the composite layer, and for each composite layer, updating, by the respective computing device assigned to the respective composite layer, parameters of the respective composite layer using the respective accumulated gradients.

17. The storage media of claim 16, wherein for each composite layer, the plurality of distinct network layers for the composite layer comprises a first boundary layer that receives the activation inputs for the composite layer and a second boundary layer that generates the activation output for the composite layer, wherein performing, at the first computing device, the forward pass through the first composite layer assigned to the first computing device using the available input activations for the first micro-batch to generate the output activations for the first composite layer for the first micro-batch, comprises:

computing, for each internal network layer in the plurality of distinct layers of the first composite layer, an internal activation operation; and storing, at the first computing device, at least one of: a first internal output activation from a first internal activation operation for a first boundary layer of the first composite layer or a second internal output activation from a second internal activation operation for a second boundary layer of the first composite layer; and wherein performing, at the first computing device, the backward pass through the first composite layer assigned to the first computing device using the available input gradients for the first micro-batch to generate the output gradients for the first composite layer for the first micro-batch comprises:

retrieving any stored internal output activation for any of the internal layers in the first composite layer, and recomputing the respective internal activation operation for all internal layers in which the output activation for the internal layer was not stored and retrieved.

18. The storage media of claim 16, wherein, for the first composite layer in the sequence of composite layers, the input activations for a given micro-batch are the training examples in the micro-batch and, for each other composite layer in the sequence, the input activations for the given micro-batch are output activations of a preceding composite layer in the sequence for the given micro-batch.

19. The storage media of claim 16, wherein, for the last composite layer in the sequence the input gradients for the given micro-batch are the output activations of the last composite layer for the given micro-batch and, for each other composite layer in the sequence, the input gradients for the given micro-batch are the output gradients of the following composite layer in the sequence for the given micro-batch.

20. The storage media of claim 16, wherein the method further comprises generating the partitioning of the multiple neural network layers into the N composite layers, comprising:

partitioning the multiple neural network layers into a first set of N composite layers;

determining that a variance between respective computational costs for each composite layer in the first set of N composite layers does not fall within a predetermined threshold, wherein the computational cost for a composite layer in the first set of N composite layers is a measure of one or more computational requirements for executing one or both of the forward pass or backward pass through the neural network; and in response to determining that the variance between respective computational costs for each composite layer in the first set of N composite layers does not fall within the predetermined threshold, repartitioning the multiple neural network layers into a second set of N composite layers.

* * * * *